(12) United States Patent
Anderson et al.

(10) Patent No.: US 7,085,948 B2
(45) Date of Patent: Aug. 1, 2006

(54) METHOD, APPARATUS, AND COMPUTER PROGRAM PRODUCT FOR IMPLEMENTING TIME SYNCHRONIZATION CORRECTION IN COMPUTER SYSTEMS

(75) Inventors: Gary Dean Anderson, Austin, TX (US); Adam Charles Lange-Pearson, Rochester, MN (US); Thomas Joseph Warne, Eyota, MN (US)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 10/422,660

(22) Filed: Apr. 24, 2003

(65) Prior Publication Data

US 2004/0215992 A1   Oct. 28, 2004

(51) Int. Cl.
*G06F 1/12* (2006.01)
*G06F 1/06* (2006.01)
*G06F 1/14* (2006.01)

(52) U.S. Cl. ............... 713/400; 713/401; 713/500; 713/502

(58) Field of Classification Search .................... None
See application file for complete search history.

(56) References Cited

U.S. PATENT DOCUMENTS

| | | | |
|---|---|---|---|
| 6,725,278 B1 * | 4/2004 | Gonzalez | 709/248 |
| 6,763,476 B1 * | 7/2004 | Dangi et al. | 713/502 |
| 2003/0123491 A1 * | 7/2003 | Couillard | 370/508 |

* cited by examiner

*Primary Examiner*—James K. Trujillo
(74) *Attorney, Agent, or Firm*—Joan Pennington

(57) ABSTRACT

A method, apparatus and computer program product are provided for implementing time synchronization correction in computer systems. A service processor includes a battery-backed hardware clock, and a hypervisor includes a hypervisor system clock. A common timer resource is accessible by the hypervisor and the service processor. To synchronize the battery-backed hardware clock and the hypervisor system clock, the common timer resource is used to measure the latency in the communication medium between the hypervisor and the service processor. The latency is then added onto the time value received in time of day messages between the hypervisor and the service processor for time synchronization correction in the computer systems.

14 Claims, 4 Drawing Sheets

METHOD, APPARATUS, AND COMPUTER PROGRAM PRODUCT FOR IMPLEMENTING TIME SYNCHRONIZATION CORRECTION IN COMPUTER SYSTEMS

FIELD OF THE INVENTION

The present invention relates generally to the data processing field, and more particularly, relates to a method, apparatus and computer program product for implementing time synchronization correction in computer systems.

DESCRIPTION OF THE RELATED ART

When two separate computer systems have independent clocks and synchronization is attempted, the responsiveness of the communication medium affects accuracy. The well known network time protocol (NTP) and its derivative SNTP (simple network time protocol) provide a solution for systems that may be widely separated but connected through a network. These protocols allow a client to synchronize its clock to a time server by making incremental changes over a period of time. An estimation of the one way trip time is averaged into the time value received by the client, and any variation in the network response is seen as jitter which is averaged out over time.

In some applications, the time required to perform multiple iterations is not available. A way to estimate the variations in the communication medium is needed so that synchronization may be accomplished in a shorter time, with a minimal amount of jitter. A need exists for an improved mechanism for implementing time synchronization correction in computer systems.

SUMMARY OF THE INVENTION

A principal object of the present invention is to provide a method, apparatus and computer program product for implementing time synchronization correction in computer systems. Other important objects of the present invention are to provide such method, apparatus and computer program product for implementing time synchronization correction in computer systems substantially without negative effect and that overcome some of the disadvantages of prior art arrangements.

In brief, a method, apparatus and computer program product are provided for implementing time synchronization correction in computer systems. The computer systems have independent clocks. For example, the computer systems include a service processor including a battery-backed hardware clock, and a hypervisor including a hypervisor system clock. A common timer resource is accessible by the hypervisor and the service processor.

A request to synchronize the service processor's battery-backed hardware clock to the hypervisor system clock is received. Responsive to the request, the hypervisor starts the common timer resource, reads a time of day from the hypervisor system clock, builds and sends a set time of day message to the service processor. Responsive to receiving the set time of day message, the service processor, reads the time of day from the hypervisor system clock from the set time of day message, reads an elapsed time from the common timer resource, and adds the elapsed time to the time of day from the hypervisor system clock. Then the service processor writes a result to the battery-backed hardware clock.

A request to synchronize the hypervisor system clock to the service processor's battery-backed hardware clock is received. Responsive to the request, the hypervisor builds and sends a get time of day message to the service processor. Responsive to receiving the get time of day message, the service processor, starts the common timer resource, reads a time of day from the battery-backed hardware clock, and sends a reply message including the time of day from the battery-backed hardware clock to the hypervisor. The hypervisor reads the time of day from the battery-backed hardware clock from the reply message, reads an elapsed time from the common timer resource, and adds the elapsed time to the time of day from the battery-backed hardware clock. Then the hypervisor writes a result to the hypervisor system clock.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENT

Figure 1:
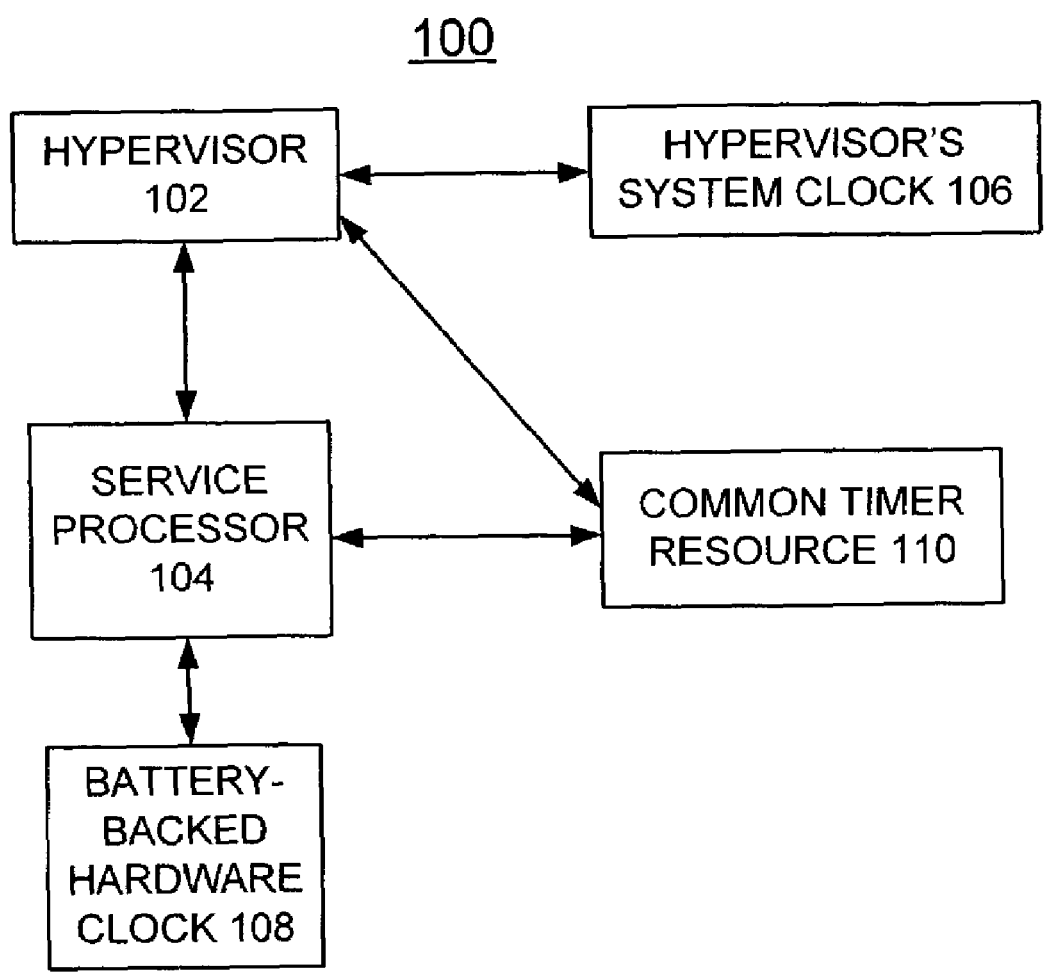
FIG. 1 is a block diagram representation illustrating apparatus for implementing time synchronization correction in computer systems in accordance with the preferred embodiment.

Referring now to the drawings, in FIG. 1 there is shown an apparatus for implementing time synchronization correction in computer systems generally designated by the reference character 100 in accordance with the preferred embodiment. As shown in FIG. 1, time synchronization correction apparatus 100 includes two computer systems represented by a hypervisor 102 and a service processor 104. Hypervisor 102 includes a hypervisor's system clock 106 managed by the hypervisor 102. Service processor 104 includes a battery-backed hardware clock 108. A common timer resource 110 is coupled via a high-speed bus to and accessible by both the hypervisor 102 and service processor 104.

The time synchronization correction apparatus 100 is shown in simplified form sufficient for an understanding of the present invention. The present invention can be used for time synchronization correction of computer systems within various computers or data processing systems having a service processor and various internal hardware or peripheral devices. The illustrated time synchronization correction apparatus 100 is not intended to imply architectural limitations.

It should be understood that the present invention is not limited for use with the illustrated hypervisor 102 and service processor 104. The time synchronization correction of the present invention can be used with other computer systems having independent clocks.

In accordance with features of the preferred embodiment, the two computer systems, hypervisor 102 and service processor 104 share the common timer resource 110. The hypervisor 102 and service processor 104 use the common timer resource 110 to measure the latency in the communication medium. The latency is then added onto the time value received. In this way, the variability in the transmission medium between the two computer systems 102 and 104 is not a factor since it can be measured precisely during every communication. The latency in the communication medium encountered while retrieving the timer value from the common timer resource 110 by each computer system 102, 104 within a single computer can be measured with much better accuracy than with multiple computers involved.

Service processor 104 is a computing device or support processor running constantly and independently of a partitioned operating system of the hypervisor 102. Service processor 104 contains the battery-backed hardware clock 108 that keeps the time while the operating system is inactive. The service processor 104 has access to the common timer resource 110 and provides an interface to set the time of the battery-backed hardware clock 108 for external clients. Hypervisor 102 controls the run-time partitioned environment, and manages the system clock 106 and the common timer resource 110. The common timer resource 110 can be implemented with various commercially available high resolution counters that can be started and stopped.

Figure 2:
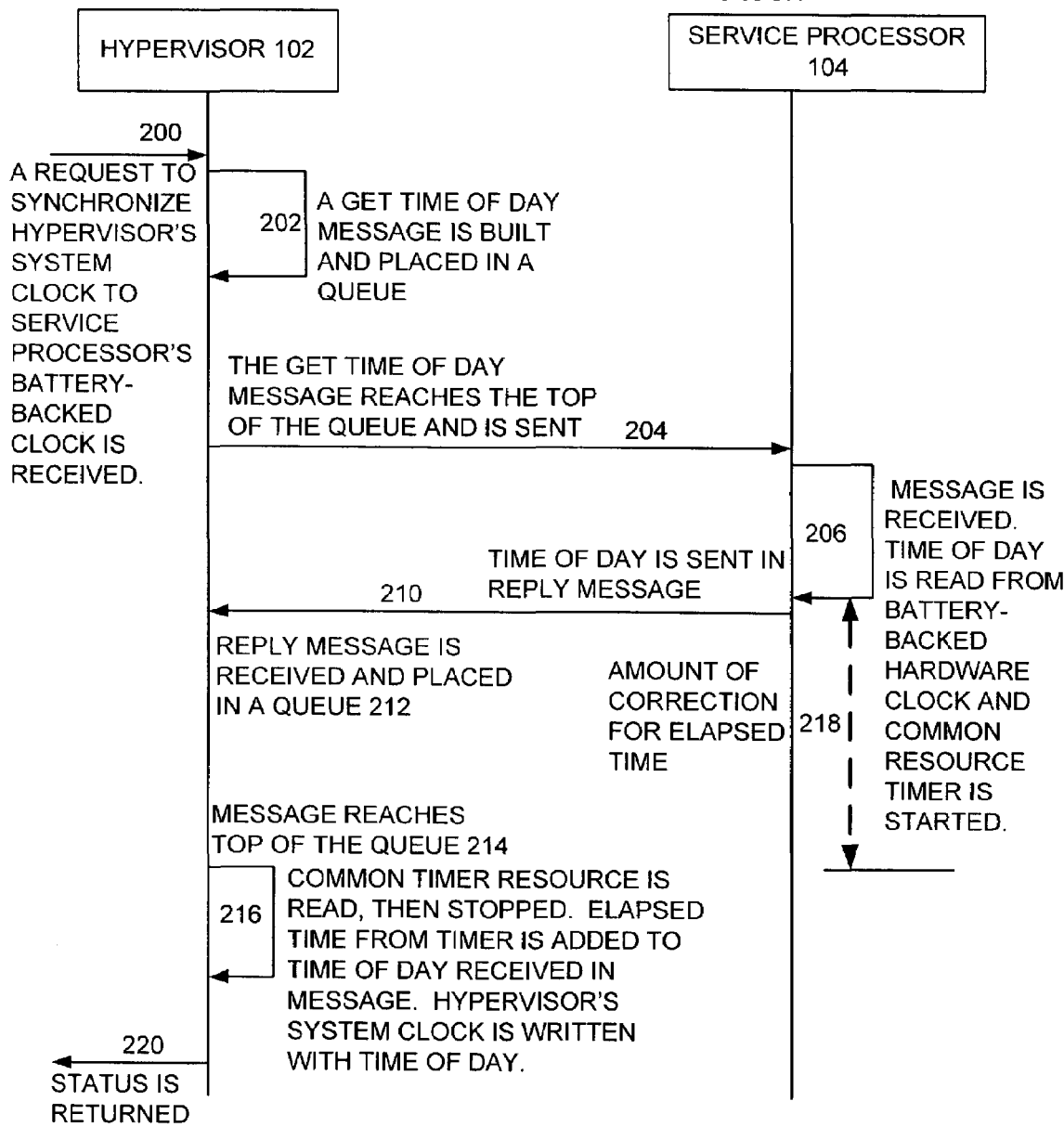
FIG. 2 is a diagram illustrating exemplary steps for implementing time synchronization correction for synchronizing the hypervisor's system clock to the service processor's battery-backed hardware clock in accordance with the preferred embodiment.

Referring now to FIG. 2, there are shown exemplary steps for implementing time synchronization correction for synchronizing the hypervisor's system clock 106 to the service processor's battery-backed hardware clock 108 in accordance with the preferred embodiment.

First as indicated at a line 200, a request to synchronize the hypervisor's system clock to the service processor's battery-backed hardware clock is received by the hypervisor 102. The hypervisor 102 reserves the common timer resource 110. Then hypervisor 102 builds a Get Time Of Day message that is placed on a queue of hypervisor's message system as indicated at a line 202. The Get Time Of Day message reaches the top of the queue and is sent to the service processor 104 as indicated at a line 204 to request the current time using a service processor external interface.

As indicated at a line 206, the service processor 104 receives the message and reads the current time or Time Of Day from the battery-backed hardware clock 108 and starts the common timer resource 110 that starts counting immediately afterward. The service processor 104 sends the current time or Time Of Day in a reply message to the hypervisor 102 as indicated at a line 210. The reply message is put on a queue in the message system as indicated at a line 212.

When at the top of the queue as indicated at a line 214, the message is routed to the hypervisor 102. The hypervisor 102 reads the current time from the reply data, then reads the common timer resource 110 immediately afterward as indicated at a line 216, and stops the common timer resource and releases the reserve. The hypervisor 102 computes the elapsed time since the timer 110 was started and adds the amount of correction for elapsed time indicated by a dotted line 218 onto the current time in the reply data. The hypervisor's system clock 106 is written with the corrected Time Of Day at line 216. Then status is returned as indicated at a line 220.

Figure 3:
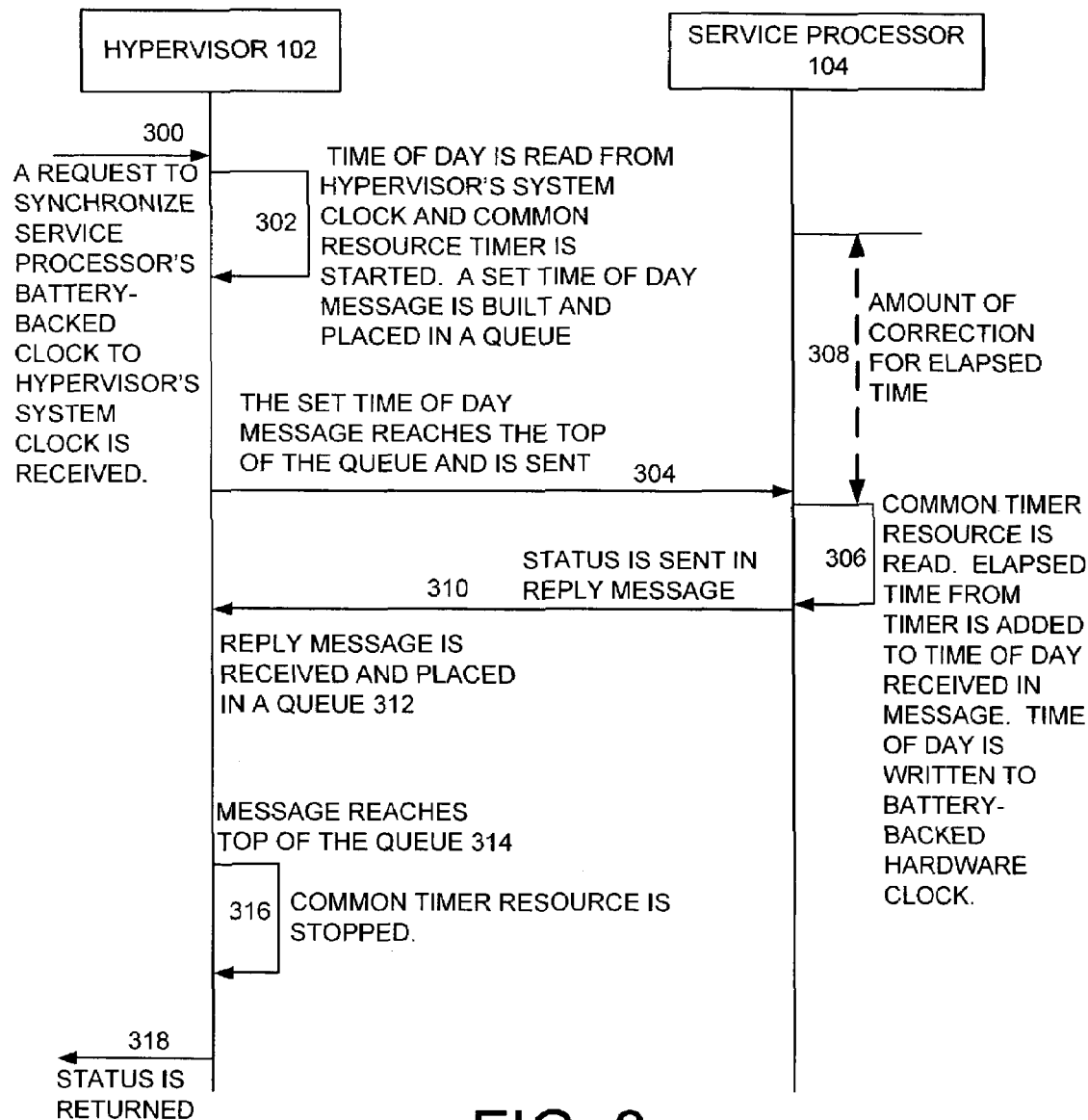
FIG. 3 is a diagram illustrating exemplary steps for implementing time synchronization correction for synchronizing the service processor's battery-backed hardware clock to the hypervisor's system clock in accordance with the preferred embodiment.

Referring now to FIG. 3, there are shown exemplary steps for implementing time synchronization correction for synchronizing the service processor's battery-backed hardware clock 108 to the hypervisor's system clock 106 in accordance with the preferred embodiment.

As indicated at a line 300, the procedure for writing the time from the hypervisor 102 to the service processor 104 starts with a request to synchronize the service processor's battery-backed hardware clock 108 to the hypervisor's system clock 106 being received by the hypervisor 102: The hypervisor reserves the common timer resource 110.

The hypervisor 102 reads its system hardware clock 106 and starts the common timer resource 110 that starts counting immediately. Then hypervisor 102 builds a Set Time Of Day message that is placed on a queue of hypervisor's message system as indicated at a line 302. The Set Time Of Day message reaches the top of the queue and is sent to the service processor 104 as indicated at a line 304 through the external interface of the service processor.

The service processor 104 receives the message and decodes the Set Time Of Day message. The service processor 104 reads the current time from the message, then reads the common timer resource immediately afterward as indicated in a block 306. The service processor 106 reads the common timer resource 110 to compute the elapsed time since the timer was started as indicated by a dotted line 308 and adds it onto the current time received. The service processor 104 sets the battery-backed clock 108 to the corrected current time, then sends status in a reply message to the hypervisor 102. The reply message is put on a queue in the message system as indicated at a line 312.

When at the top of the queue as indicated at a line 314, the message is routed to the hypervisor 102. The hypervisor 102 stops the common timer resource 110 and releases the reserve as indicated at a line 316. Then status is returned as indicated at a line 318.

Figure 4:
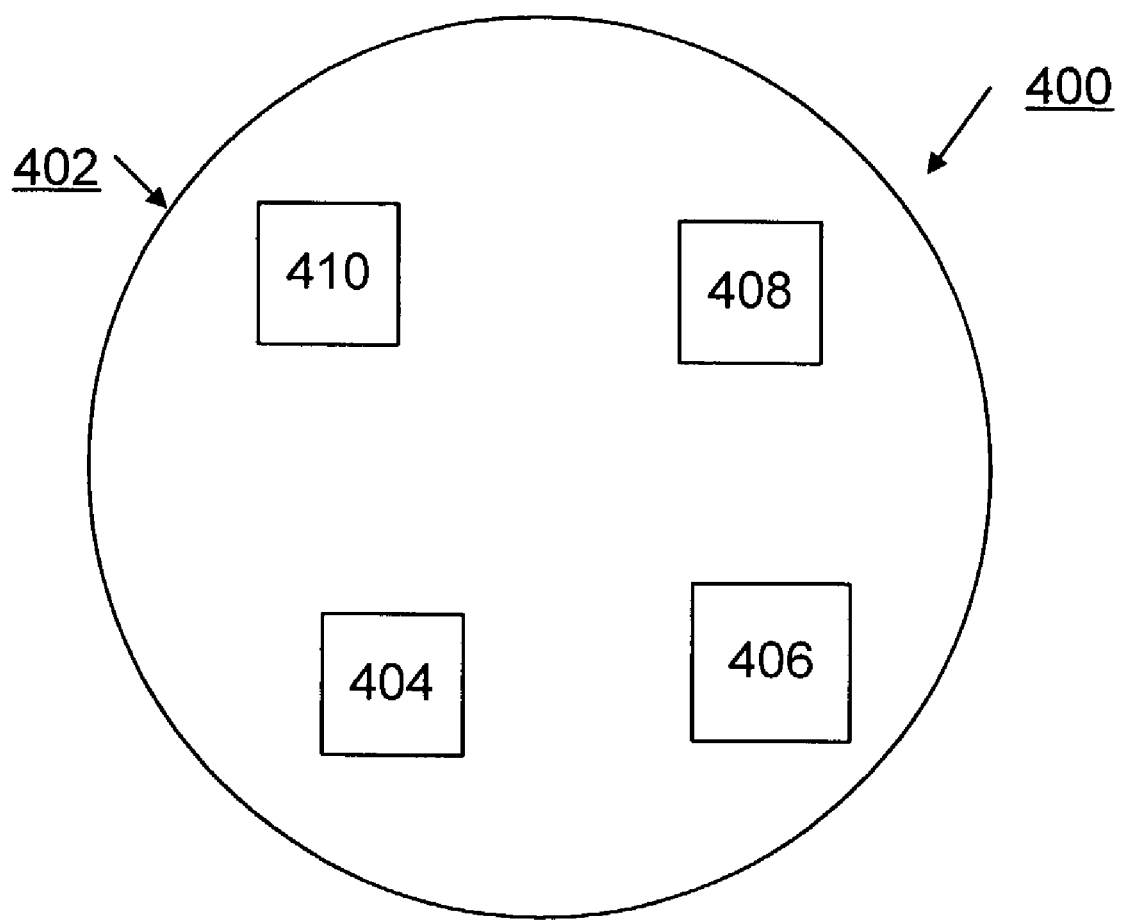
FIG. 4 is a block diagram illustrating a computer program product in accordance with the preferred embodiment.

Referring now to FIG. 4, an article of manufacture or a computer program product 400 of the invention is illustrated. The computer program product 400 includes a recording medium 402, such as, a floppy disk, a high capacity read only memory in the form of an optically read compact disk or CD-ROM, a tape, a transmission type media such as a digital or analog communications link, or a similar computer program product. Recording medium 402 stores program means 404, 406, 408, 410 on the medium 402 for carrying out the methods for implementing time synchronization correction of the preferred embodiment in the apparatus 100 of FIG. 1.

A sequence of program instructions or a logical assembly of one or more interrelated modules defined by the recorded program means 404, 406, 408, 410, direct the computer systems 102,104 of apparatus 100 for implementing time synchronization correction of the preferred embodiment.

While the present invention has been described with reference to the details of the embodiments of the invention shown in the drawing, these details are not intended to limit the scope of the invention as claimed in the appended claims.

What is claimed is:

1. A method for implementing time synchronization correction correction in a first computer system and a second computer system, the first and second computer systems having independent clocks, said method comprising the steps of:

providing a common timer resource accessible by each of the computer systems;

receiving a request to synchronize the second computer system's clock to the first computer system's clock by the first computer system;

responsive to said request, the first computer system starting said common timer resource, reading a time of day from the first computer system's clock, building and sending a set time of day message to the second computer system;

responsive to receiving said set time of day message, the second computer system reading said time of day from the first computer system's clock from said set time of day message, reading an elapsed time from said common timer resource, adding said elapsed time to said time of day from the first computer system's clock, and writing a result to the second computer system's clock:

receiving a request to synchronize the first computer system's clock to the second computer system's clock by the first computer system;

responsive to said request, the first computer system building and sending a get time of day message to the second computer system;

responsive to receiving said get time of day message, the second computer system reading said time of day from the second computer system's clock; and starting said common timer resource;

the second computer system sending a reply message to the first computer system including said read time of day from the second computer system's clock;

the first computer system, reading said time of day from the second computer system's clock from said reply message, reading an elapsed time from said common timer resource, adding said elapsed time to said time of day from the second computer system's clock, and writing a result to the first computer system's clock.

2. The method for implementing time synchronization correction as recited in claim 1 further includes the step of the second computer system, responsive to writing said result, of sending status in a reply message to the first computer system.

3. The method for implementing time synchronization correction as recited in claim 2 further includes the step of the first computer system, responsive to receiving said reply message from the second computer system, stopping said common timer resource.

4. The method for implementing time synchronization correction as recited in claim 1 further includes the steps responsive to reading said elapsed time from said common timer resource, of stopping said common timer resource.

5. Apparatus for implementing time synchronization correction in computer systems having independent clocks, said apparatus comprising:

a service processor including a battery-backed hardware clock;

a hypervisor including a hypervisor system clock; and a common timer resource accessible by each of the computer systems;

said hypervisor for receiving a request to synchronize said hypervisor system clock to said service processor's battery-backed hardware clock; and responsive to said request, said hypervisor starting said common timer resource, reading a time of day from said hypervisor system clock, building and sending a set time of day message to said service processor; and said service processor responsive to receiving said set time of day message, reading said time of day from said hypervisor system clock from said set time of day message, reading an elapsed time from said common timer resource, adding said elapsed time to said time of day from said hypervisor system clock, and writing a result to said battery-backed hardware clock.

6. The apparatus for implementing time synchronization correction as recited in claim 5 wherein said hypervisor for receiving a request to synchronize said service processor's battery-backed hardware clock to said hypervisor system clock; and responsive to said request, said hypervisor starting building and sending a get time of day message to said service processor.

7. The apparatus for implementing time synchronization correction as recited in claim 6 wherein said service processor, responsive to receiving said get time of day message, for reading a time of day from said battery-backed hardware clock and starting said common timer resource.

8. The apparatus for implementing time synchronization correction as recited in claim 7 wherein said service processor for sending said time of day from said battery-backed hardware clock in a reply message to said hypervisor.

9. The apparatus for implementing time synchronization correction as recited in claim 7 wherein said hypervisor, responsive to receiving said reply message, for reading time of day from said battery-backed hardware clock, reading an elapsed time from said common timer resource, adding said read time of day and said elapsed time, and writing a result to said hypervisor system clock.

10. A computer program stored on a recording medium for implementing time synchronization correction in computer systems including a service processor including a battery-backed hardware clock, a hypervisor including a hypervisor system clock, and a common timer resource accessible by the hypervisor and the service processor; said computer program including instructions executed by the hypervisor and service processor to cause the hypervisor and the service processor to perform the steps of:

receiving a request to synchronize the service processor's battery-backed hardware clock to the hypervisor system clock;

responsive to said request, the hypervisor starting said common timer resource, reading a time of day from the hypervisor system clock, building and sending a set time of day message to the service processor; and responsive to receiving said set time of day message, the service processor, reading said time of day from the hypervisor system clock from said set time of day message, reading an elapsed time from said common timer resource, adding said elapsed time to said time of day from the hypervisor system clock, and writing a result to the battery-backed hardware clock.

11. The computer program stored a recording medium for implementing time synchronization correction in computer systems as recited in claim 10 includes the step of receiving a request to synchronize the hypervisor system clock to the service processor's battery-backed hardware clock.

12. The computer program stored a recording medium for implementing time synchronization correction in computer systems as recited in claim 11 includes the steps responsive to said request to synchronize the hypervisor system clock to the service processor's battery-backed hardware clock, the hypervisor building and sending a get time of day message to the service processor.

13. The computer program stored a recording medium for implementing time synchronization correction in computer systems as recited in claim 12 includes the steps of the service processor, responsive to receiving said get time of day message, reading a time of day from the battery-backed hardware clock, and starting the common timer resource;

and sending said time of day from the battery-backed hardware clock in a reply message to the hypervisor.

14. A computer program stored a recording medium for implementing time synchronization correction in computer systems as recited in claim 13 includes the steps of the hypervisor, responsive to receiving said reply message, reading time of day from the battery-backed hardware clock, reading an elapsed time from the common timer resource, adding said read time of day and said elapsed time, and writing a result to the hypervisor system clock.

* * * * *